United States Patent [19]

Ishikawa et al.

[11] Patent Number: 5,690,500
[45] Date of Patent: Nov. 25, 1997

[54] ELECTRICAL CONNECTING DEVICE FOR CONNECTING ROTOR WITH STATOR THROUGH CABLE

[75] Inventors: Satoshi Ishikawa; Nobuhiko Suzuki, both of Shizuoka-ken, Japan

[73] Assignee: Yazaki Corporation, Tokyo, Japan

[21] Appl. No.: 681,991

[22] Filed: Jul. 30, 1996

[30] Foreign Application Priority Data

Aug. 11, 1995 [JP] Japan .................. 7-206043

[51] Int. Cl.$^6$ ................................. H01R 3/00
[52] U.S. Cl. ......................................... 439/164
[58] Field of Search ................................. 439/164

[56] References Cited

U.S. PATENT DOCUMENTS

| | | | |
|---|---|---|---|
| 4,540,223 | 9/1985 | Schmerda et al. | 439/164 |
| 5,219,460 | 6/1993 | Kato et al. | 439/164 |
| 5,259,775 | 11/1993 | Kubota et al. | 439/164 |
| 5,277,604 | 1/1994 | Ida et al. | 439/164 |

FOREIGN PATENT DOCUMENTS 4-328071  11/1992  Japan .
4-333473  11/1992  Japan .

*Primary Examiner*—Neil Abrams
*Assistant Examiner*—T. C. Patel
*Attorney, Agent, or Firm*—Finnegan, Henderson, Farabow, Garrett & Dunner, L.L.P.

[57] ABSTRACT

An electrical connecting device includes a stator consisting of a cylindrical housing, a rotor, a flexible flat cable and a carrier. Being accommodated in an annular space defined between the rotor and the stator, the flat cable has an end fixed to the stator and another end fixed to the rotor. The carrier has a gap in the circumferential direction, providing C-shaped member. The flat cable is wound along the outer periphery of the rotor in one winding direction, while the flat cable is also wound along the inner periphery of the stator in the opposite winding direction, through a turning part of the flat cable. The carrier is provided with a pusher part for pushing the flat cable. The pusher part is formed to project from an inner edge of one circumferential end of the carrier toward another circumferential end around which the turning part of the flat cable is looped. When the flexible flat cable is drawn out of the gap of the carrier, the pusher part serves to depress the swollen part of the flexible flat cable. Consequently, the flexible flat cable can be moved smoothly without buckling.

6 Claims, 3 Drawing Sheets

ELECTRICAL CONNECTING DEVICE FOR CONNECTING ROTOR WITH STATOR THROUGH CABLE

BACKGROUND OF THE INVENTION

1. Technical Field

The present invention relates to an electrical connecting device between a stator and a rotor rotatably arranged in the stator, which connects electrical elements on the stator's side of a steering apparatus of a vehicle with other electrical elements on the rotor's side through the intermediary of a flat cable arranged in an annular space defined between the stator and the rotor.

2. Description of the Related Art

Recently, with the progress in electronic control technology for vehicles, a handle (or a steering wheel) in a steering apparatus of the vehicle has been provided with a variety of switches for electronic control and therefore, it has been required to connect such switches with electrical elements on the steering column's side of the vehicle by means of electrical wiring. Of course, since the handle of the vehicle is so constructed as to be rotatable in both clockwise and counter-clockwise directions at plural rotations, an electrical connection device having a flexible flat cable (FFC) has been used in order to connect a rotor shaft of the handle to a steering column electrically. In detail, the flexible flat cable is composed of a plurality of lead wires (or conductors) and arranged between the rotor secured to a handle spindle and a housing as the "stator" secured to the steering column, in a spiral manner or a "reversed" spiral manner where the flexible flat cable is turned back halfway. Note, the flexible flat cable will be also referred as "the FFC" for short, hereinafter.

For instance, there is known an electrical connecting device which includes a rotor assembly consisting of a first rotor and a second rotor, into which a handle spindle of the vehicle is inserted and secured to the rotor assembly, and a stator consisting of an upper cover and an under cover. Both upper cover and under cover form a cylindrical housing in which the rotor assembly is accommodated so as to rotate and which is fixed to a member on the steering column's side of the vehicle. Being accommodated in an annular space defined between the rotor and the housing, the FFC serves to connect electrical elements on the handle's side of the vehicle with other elements on the steering column's side.

Fixed to the housing consisting of the upper cover and under cover is an internal gear in which the FFC is accommodated. Mounted on both of a lower flange of the internal gear and a lower flange of the first rotor is a carrier as "a moving member" which is capable of rotating with respect to the internal gear and the first rotor relatively.

The carrier is provided with one and only gap in the circumferential direction, providing C-shaped configuration. The FFC is wound along an annular space defined between the outer peripheral face of the first rotor and the inner peripheral face of the carrier and then looped around a circumferential end of the carrier, forming a turning part of the FFC. As a boundary of the turning part, the remaining FFC is wound along another annular space defined between the inner peripheral face of the internal gear and the outer peripheral face of the carrier in the opposite direction to the winding direction about the first rotor. Finally, the FFC is drawn out of the internal gear through a notch formed in the internal gear.

By the way, it should be recognized that, in operation of the above-mentioned electrical connecting device, a top face of the carrier is brought into "surface" contact with the cover, while an under face of the carrier is brought into surface contact with the lower flanges of the first rotor and the internal gear. Further, the inner and outer peripheral faces of the carrier are brought into surface contact with the flat cable in the longitudinal direction. In connection, it is noted that in case of a carrier disclosed in Japanese Unexamined Patent Publication No. 4-333473, the inner and outer peripheral faces of the carrier are brought into "line" contact with the flat cable since the carrier has a projection formed on the outer peripheral face. In addition, the carrier is formed to have a large mass occupying the most part of the annular space.

By the above-mentioned reasons, it will be understood that a frictional resistance of the carrier in moving is large.

Hereat, when the first rotor is rotated so that the FFC is drawn from a space defined between the first rotor and the carrier into another space defined between the carrier and the internal gear, a part of the FFC wound about the periphery of the first rotor is inflated outwardly and urged against the inner peripheral face of the carrier. Therefore, also due to the above largesse in frictional resistance, it becomes difficult that the FFC moves to the outside of the carrier through the gap. Consequently, the FFC (part) wound about the first rotor is forced out of the gap of the carrier thereby causing the buckling of the FFC, so that it is impossible to pay out the FFC smoothly.

In order to solve such a problem, Japanese Unexamined Patent Publication No. 4-328071 discloses a structure where a plurality of rollers, which are connected with each other through springs, are respectively arranged on the inner and outer peripheral faces of the carrier, so that the carrier is urged against the outer periphery of the first rotor and the inner periphery of the housing (internal gear).

However, since the above structure requires many rollers and springs, the number of parts is increased to cause the workability in assembling for the worse and the manufacturing cost for the rise.

SUMMARY OF THE INVENTION

It is therefore an object of the present invention to provide an electrical connecting device which is capable of preventing the flexible flat cable from buckling thereby to smooth the movement of the cable without increasing the number of parts.

The object of the present invention described above can be accomplished by an electrical connecting device comprising:

a stator in form of a substantially cylindrical housing;

a rotor arranged in the stator so as to rotate therein;

a flexible flat cable accommodated in an annular space defined between the rotor and the stator so that one end of the flat cable is fixed on the stator while the other end of the flat cable is fixed on the rotor thereby connecting elements on the rotor's side to other elements on the stator's side electrically, the flat cable being wound along the outer periphery of the rotor in one winding direction and wound along the inner periphery of the stator in the opposite winding direction through a turning part of the flat cable as a boundary; and a movable member arranged in the annular space so that spaces for accommodating the flat cable are defined between the movable member and the outer periphery of the rotor and between the movable member and the inner periphery of the stator, the movable member being constituted by a C-shaped member having a gap through which the turning part of the flat cable passes, whereby the movable member rotates relatively with respect to the rotation of the rotor while rotating and moving with respect to the stator with the circumferential movement of the turning part caused by winding the flat cable on the outer periphery of the rotor or winding the flat cable on the inner periphery of the stator;

wherein the movable member is provided with a pusher part for pushing the flat cable, the pusher part projecting from an inner edge of one circumferential end of the movable member toward another circumferential end around which the turning part of the flat cable is looped, both of the circumferential ends defining the gap, whereby a through opening for passing through the flat cable is defined between the another circumferential end and the pusher part of the movable member. With the arrangement mentioned above, when the flexible flat cable is drawn out of a space defined between the first rotor and the movable member into another space defined between the stator and the movable member through the gap and even though a part of the flexible flat cable wound about the first rotor is on the point of sticking out of the gap since the part is swollen and urged against the inner peripheral face of the movable member fractionally, the pusher part at the gap serves to depress the swollen part of the flexible flat cable. Consequently, the flexible flat cable can be moved smoothly without buckling. In the present invention, preferably, the pusher part is constituted by an elastic member exhibiting an urging force directing the rotor.

In this case, it is possible to restrict an expansion of the flexible flat cable wound about the outer periphery of the first rotor toward the inner periphery of the movable member, so that the effect to prevent the flexible flat cable from buckling can be further improved.

More preferably, the stator comprises an upper cover and an under cover to be fitted to the upper cover.

It is also preferable that the stator further comprises an internal gear fixed to the under cover, while the rotor has a gear portion formed on an outer periphery thereof.

In addition, it is preferable that the movable member comprises a carrier and a plurality planetary gears rotatably carried by the carrier and that the planetary gears are arranged so as to mesh with the internal gear and the gear portion of the rotor.

More preferably, the internal gear is provided with a notch through which the flat cable is drawn out of the internal gear.

These and other objects and features of the present invention will become more fully apparent from the following description and appended claims taken in conjunction with the accompany drawing.

DESCRIPTION OF THE PREFERRED EMBODIMENT

Figure 1:
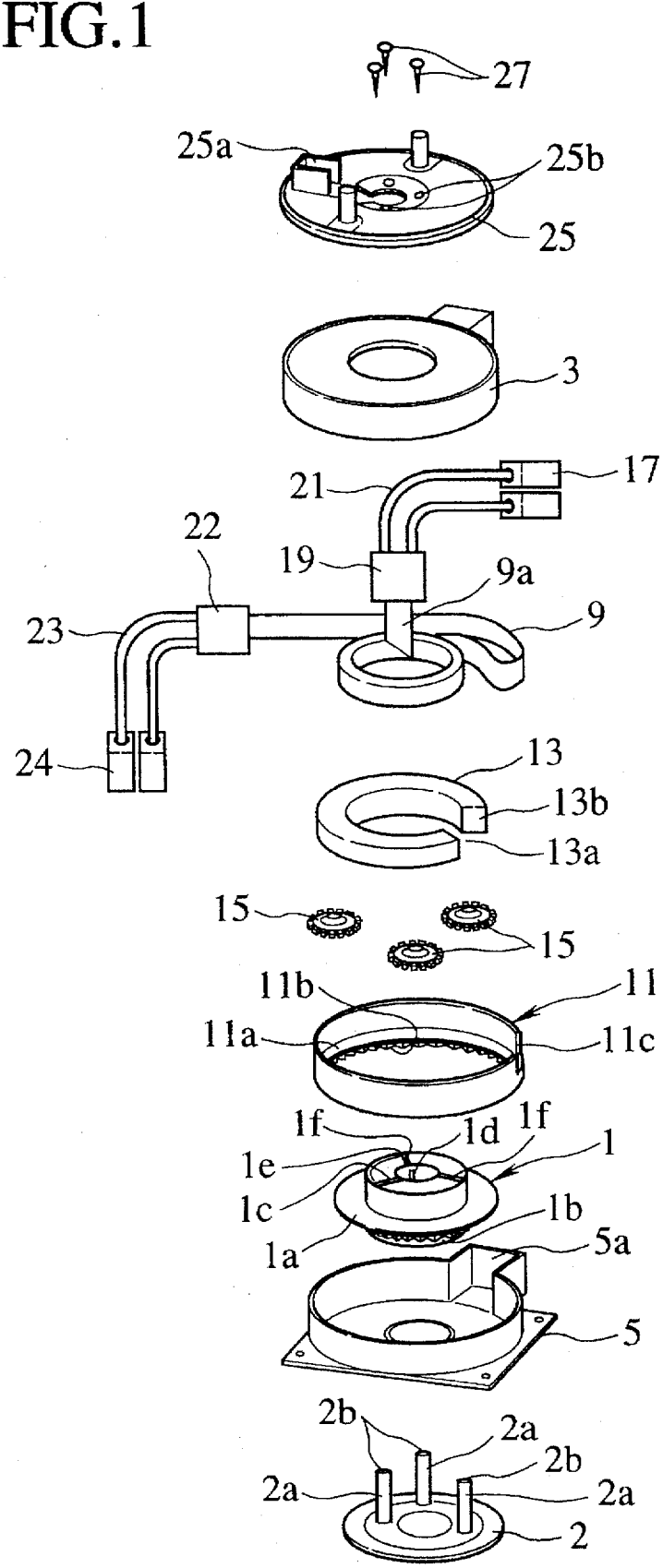
FIG. 1 is a perspective view showing a disassembled electrical connecting device in accordance with an embodiment of the present invention.

An embodiments of the present invention will be described with reference to the drawings. In figures, FIG. 1 is a perspective view of an electrical connecting device in an exploded condition.

The electrical connecting device includes a first rotor 1 and a second rotor 2 as "rotor" of the invention, into which a not-shown handle spindle of the vehicle is inserted and secured, and an upper cover 3 and an under cover 5 as "stator" of the invention, which constitute a cylindrical housing. In the housing, the rotor is carried so as to rotate therein. The housing is fixed to a not-shown member on the steering column's side of the vehicle. Accommodated in an annular space 7 defined between the rotor and the housing is a flexible flat cable (FFC) 9 which connects electrical elements (not shown) on the handle's side to other electrical elements on the steering column's side.

Fixed in the housing consisting of the upper cover 3 and the under cover 5 is an internal gear 11 in which the FFC 9 is accommodated. On both of a flange 11a of the internal gear 11 and a flange 1a of the first rotor 1, a carrier 13 constituting "moving member" of the invention is arranged so as to rotate with respect to the first rotor 1 and the internal gear 11 relatively. The internal gear 11 is provided on a lower internal face thereof with a gear portion 11b, while the first rotor 1 is provided on a lower external face thereof with a gear portion 1b to be opposed to the gear portion 1b. The respective gears portions 11b, 1b are in mesh with a plurality of planetary gears 15 rotatably mounted on an under face of the carrier 13. That is, owing to rotations of the planetary gears 15 with the rotation of the first rotor 1, the carrier 13 rotates and moves to the same direction as the first rotor's direction at the fixed deceleration ratio with respect to the first rotor 1 with revolutions of the planetary gears 15.

Figure 2:
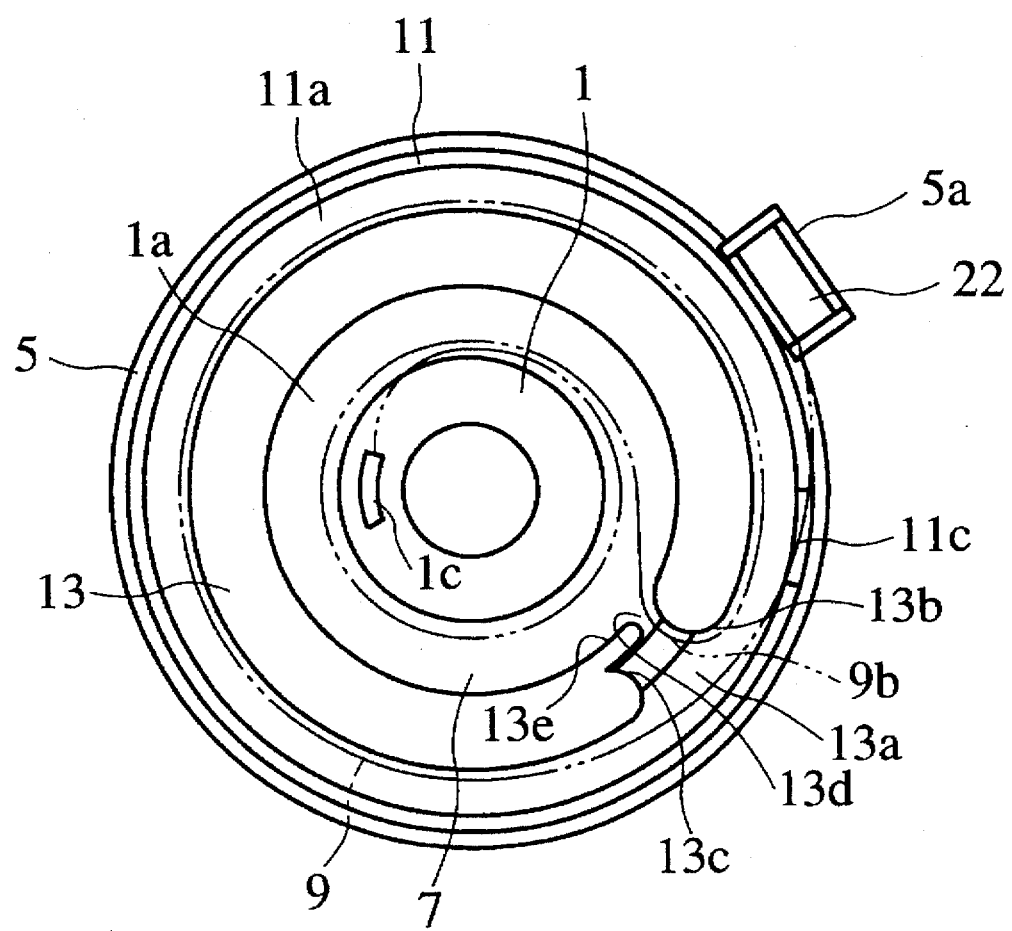
FIG. 2 is a plan view of the electrical connecting device of the embodiment, showing a flexible flat cable in the accommodated condition.
Figure 3:
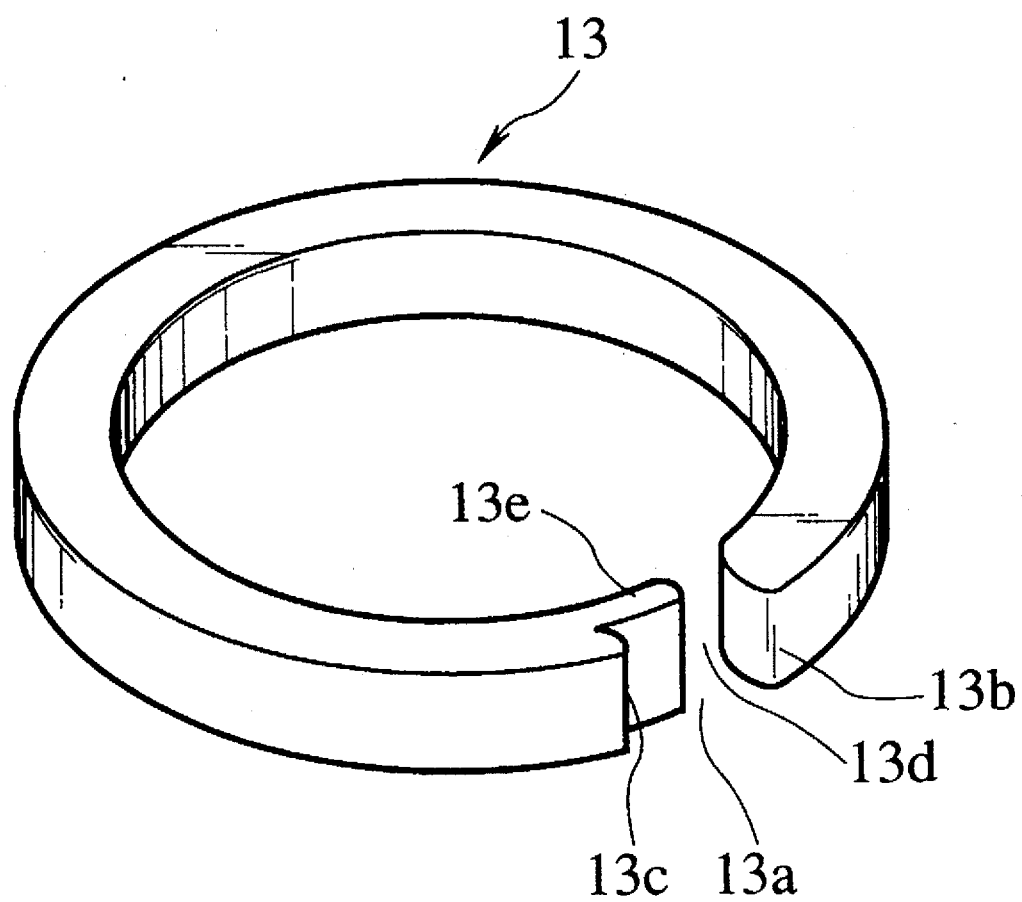
FIG. 3 is a perspective view of a carrier which is used in the electrical connecting device of FIG. 1.

The carrier 13 is provided in the circumferential direction with one and only opening (gap) 13a, providing C-shaped configuration. FIG. 2 shows the FFC 9 in its accommodated condition in the annular space by a double-dotted line. The FFC 9 has a lapel part 9a adjacent to one end on the inner peripheral side, which is fixed to a fixing part 1c of the first rotor 1 and connected to a connector 17 through the intermediary of a molding part 19 and lead wires 21. The FFC 9 drawn out of the molding part 19 is wound along an annular space defined between the outer peripheral face of the first rotor 1 and the inner peripheral face of the carrier 13 and then looped around an end 13b of the carrier 13 to form a turning part 9b of the FFC 9. Next, the FFC 9 is wound along an annular space defined between the inner peripheral face of the internal gear 11 and the outer peripheral face of the carrier 13 in the opposite direction and then drawn out of the internal gear 11 through a notch 11c, so that a molding part 22 attached to the other end of the FFC 9 is fixed in a swelling part 5a of the undercover 5. Connectors 24 are connected to the molding part 22 through lead wires 23.

The under cover 5 is covered with an upper cover 25 which rotates together with the first and second rotors 1, 2. The molding part 19 of the FFC 9 is secured in a fixing part 25a formed on the upper cover 25. Three screw holes 25b are formed in the upper cover 25, while three boss parts 2a are formed on an upper face of the second rotor 2 for engagement with the holes 25b, respectively. Each boss part 2a is provided on an upper end thereof with a screw hole 2b. The boss parts 2a are inserted into insertion grooves 1d formed from the lower face of the first rotor 1 upwardly, so that respective leading ends of the parts 2a abut on an under face of an upper flange 1e of the first rotor 1. The upper flange 1e is provided with three screw holes 1f. In assembly, the rotors and the housing can be assembled to each other by inserting three screws 27 into the screw holes 25b of the upper cover 25 and the screw holes 1f of the first rotor 1 and sequent screwing into the screw holes 2b of the second rotor 2, respectively.

The FFC 9 has a length enough to follow several rotations of the handle with several rotations. Therefore, with the clockwise rotation of the first rotor 1 in FIG. 2, the FFC 9 (a part) wound about the outer periphery of the first rotor 1 can be undid, while such an undid part of the FFC 9 is gradually wound between the inner periphery of the internal gear 11 and the outer periphery of the carrier 13. On the contrary, when the first rotor 1 rotates in the counterclockwise rotation in FIG. 2, the FFC 9 (a part) wound between the inner periphery of the internal gear 11 and the outer periphery of the carrier 13 is undid, while such an undid part of the FFC 9 is gradually wound about the first rotor 1. At this time, the turning part 9b of the FFC 9 moves in the circumferential direction of the housing together with the carrier 13.

In the above-mentioned arrangement, according to the embodiment, the carrier 13 has a pusher part 13e for pushing the FFC 9, which is arranged in the vicinity of an end 13c opposite to the end 13b defining the above gap 13a. In detail, the pusher part 13e is so formed as to project from an inner edge of the end 13c toward an inner edge of the end 13b, defining a through opening 13d for passing the FFC 9 therethrough.

The inner peripheral face of the pusher part 13e is curved so as to form an identical surface together with the inner peripheral face of the carrier 13.

With the arrangement mentioned above, when the first rotor 1 is rotated in the clockwise direction of FIG. 2 so that the FFC 9 is drawn out of a space defined between the first rotor 1 and the carrier 13 into another space defined between the internal gear 11 and the carrier 13 through the opening 13d at the gap 13a and even though a part of the FFC 9 wound about the first rotor 1 is on the point of sticking out of the gap 13a since the part is swollen and urged against the inner peripheral face of the carrier 13 frictionally, the pusher part 13e at the gap 13a serves to depress the swollen part of the FFC 9. Consequently, the FFC 9 can be moved smoothly without buckling.

That is, the above-mentioned prevention of the FFC 9 from buckling can be carried out by a simple structure where the pusher part 13w is formed in integral with the carrier 13 of a C-shaped member, so that the increase in manufacturing cost can be minimized without an addition of any exclusive parts for preventing buckling and a deterioration in assembling workability.

Furthermore, in case that the pusher part 13e is constituted by an elastic member exhibiting an urging force directing the first rotor 1, it is possible to restrict an expansion of the FFC 9 wound about the outer periphery of the first rotor 1 toward the inner periphery of the carrier 13, so that the effect to prevent the FFC from buckling can be further improved.

Finally, it will be understood by those skilled in the art that the foregoing description is one of preferred embodiments of the disclosed electrical connecting device, and that various changes and modifications may be made to the present invention without departing from the spirit and scope thereof.

What is claimed is:
1. An electrical connecting device comprising:
  a stator provided by a substantially cylindrical housing;
  a rotor rotatable within said stator;
  a flexible flat cable accommodated in an annular space defined between said rotor and said stator so that one end of said flat cable is fixed on said stator while the other end of said flat cable is fixed on said rotor thereby electrically connecting elements on said rotor to other elements on said stator, said flat cable being wound along the outer periphery of said rotor in one winding direction and wound along the inner periphery of said stator in the opposite winding direction through a bend in said flat cable, the bend forming a boundary between the winding directions; and
  a C-shaped movable member in said annular space and defining spaces for accommodating said flat cable between said movable member and the outer periphery of said rotor and between said movable member and the inner periphery of said stator, said C-shaped movable member having a pair of spaced circumferential ends to provide a gap through which said bend in said flat cable passes, whereby said C-shaped movable member rotates relative to said rotor while rotating and to said stator with circumferential movement of said bend caused by winding said flat cable on the outer periphery of said rotor or along the inner periphery of said stator;
  said movable member having a pusher part for pushing said flat cable, said pusher part projecting from an inner edge of one of said pair of circumferential ends of said C-shaped movable member as a relatively thin extension toward the other of said pair of circumferential ends around which said bend in said flat cable is looped
  whereby an opening for passing said flat cable through said gap is defined in part between said other of said pair of circumferential ends and said pusher part, and in part by both said pair of circumferential ends.

2. An electrical connecting device as claimed in claim 1, wherein said pusher part comprises an elastic member exhibiting an urging force directed toward said rotor.

3. An electrical connecting device as claimed in claim 2, wherein said stator comprises an upper cover and an under cover fitted to said upper cover.

4. An electrical connecting device as claimed in claim 3, wherein said stator further comprises an internal gear fixed to said under cover, and said rotor has a gear portion formed on an outer periphery thereof.

5. An electrical connecting device as claimed in claim 4, wherein said C-shaped movable member comprises a carrier and a plurality of planetary gears rotatably carried by said carrier, said planetary gears being in mesh with said internal gear and said gear portion of said rotor.

6. An electrical connecting device as claimed in claim 5, wherein said internal gear is provided with a notch through which said flat cable is drawn out of said internal gear.

* * * * *